J. MEILE.
VEHICLE SIGNAL.
APPLICATION FILED NOV. 27, 1916.
1,268,749.
Patented June 4, 1918.
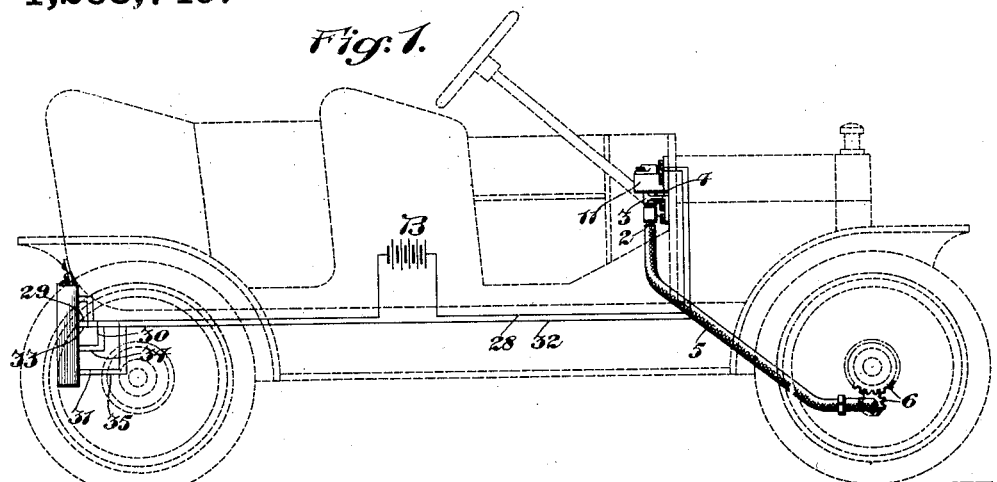
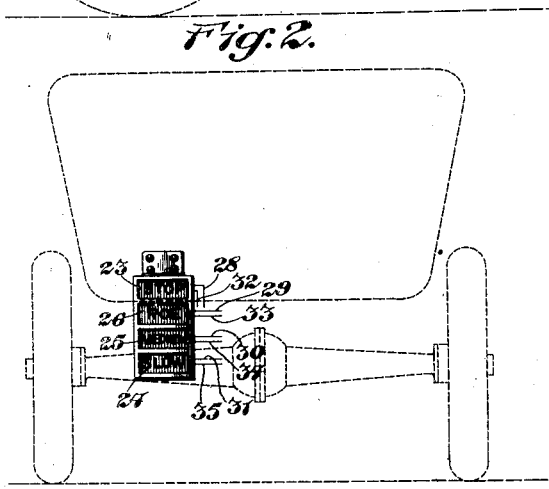
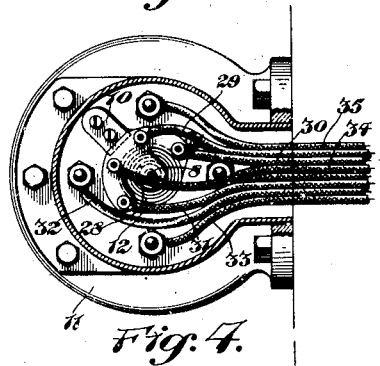
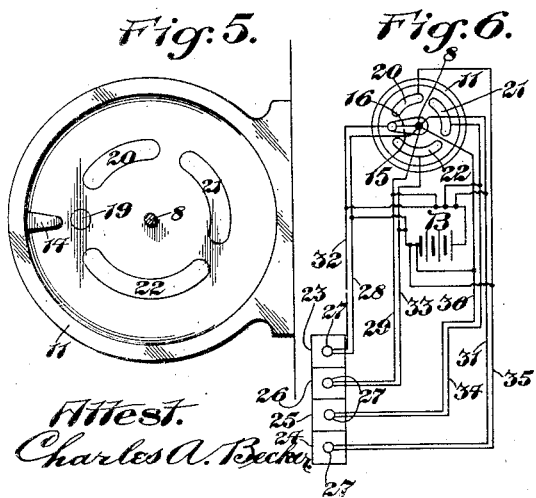
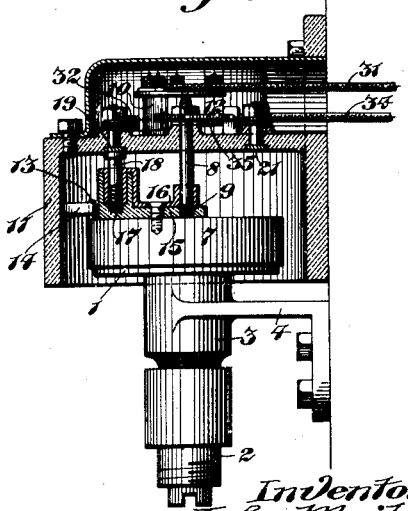
Attest.
Charles A. Becker
Inventor:
John Meile,
by Pippey & Kingsland
His Attorneys.

UNITED STATES PATENT OFFICE.

JOHN MEILE, OF EAST ST. LOUIS, ILLINOIS.

VEHICLE-SIGNAL.

1,268,749.  Specification of Letters Patent.  Patented June 4, 1918.

Application filed November 27, 1916. Serial No. 133,531.

*To all whom it may concern:*

Be it known that I, JOHN MEILE, a citizen of the United States, residing at the city of East St. Louis, county of St. Clair, and State of Illinois, have invented a new and useful Vehicle-Signal, of which the following is a specification.

This invention relates to improvements in vehicle signals, and consists in the novel design, arrangement and combination of parts hereinafter more fully disclosed.

An object of the invention is to provide a vehicle signal controlled coördinately with the speed of the vehicle.

Another object of the invention is to provide a visible signal indicating the speed of movement from the stationary position through various degrees of speed of the vehicle.

Additional features and advantages attainable from the invention will be recognized without specific mention from the following detailed description thereof, taken in connection with the accompanying drawings in which—

Figure 1 is a view illustrating the embodiment of the invention as applied to an automobile.

Fig. 2 is a rear view of the signal embodied in an automobile.

Fig. 3 is a cross section through the upper part of the instrument controlling the switch mechanism of the signal.

Fig. 4 is a vertical section through the same element.

Fig. 5 is a view showing in bottom plan the upper part of the device for controlling the switch mechanism of the signal.

Fig. 6 is a diagrammatic view illustrating the switch mechanism, the signal elements with the system of wiring, and the energizing means between the switch and the signal elements.

As illustrated in the drawing, the invention includes a magnetically controlled switch comprising a circular movable magnet 1 attached to a revoluble shaft 2 journaled in a bearing 3 which is supported by a bracket 4, the bracket 4 being designed so that the instrument may be supported on a rigid part of the vehicle, preferably on the dash of the motor vehicle, as illustrated in the drawing. The circular magnet 1 is revolved coördinately with the speed of the vehicle in a manner similar to that of a speedometer of the magnetic type through a flexible shaft 5 attached at its upper end to the shaft 2 and connected at its lower end with a wheel of the vehicle through gear and pinion construction 6.

An inverted cup 7 is fitted over the circular magnet 1 and is spaced a slight distance therefrom as is usual in the magnetic type of speedometers. The inverted cup 7 is mounted upon a shaft the upper end 8 of which is of material that is electrically conducting and the lower end 9 of which is of insulating material. The shaft comprising the parts 8 and 9 extends axially through the cup 7, the lower end thereof having a frictionless bearing at the bottom of a recess formed in the upper part of the shaft 2, and the upper end of said shaft having a bearing in a contact member 10 supported on the upper wall of a case 11, the case 11 forming a housing for the instrument. A hair spring 12 is coiled about the upper end of the shaft 8—9 and holds the inverted cup 7 in normal position, with a lug 13 on the cup abutting against an abutment member 14 on the side of the case 11.

As the circular magnet is revolved through its connection with the wheel of the vehicle, it acts with a magnetic force against the inverted cup 7. As the speed of the magnet increases the magnetic pull upon the inverted cup 7 is dependent upon the speed of the vehicle; the hair spring 12 compensating and acting against the magnetic pull determines accurately the extent of movement of the cup coördinately with the speed of the vehicle.

Upon the top face of the inverted cup 7 is a switch arm comprising an insulated block 15 upon which is fitted an electrically conducting plate 16 which has contact at its inner end with the electrically conducting shaft 8. The block 15 is recessed to receive a spring 17 upon which a movable contact pin 18 is mounted. Embedded in the under face of the case 11 are a series of contact segments 19, 20, 21 and 22 respectively. The contact segments referred to are arranged so that as the cup 7 is revolved the terminal pin 18 will be brought successively in contact with said segments. A case including separate compartments is mounted at the rear of the vehicle. Each compartment has a separately designated window of translucent material and bearing separate lengends indicating signals or other preferred designations. In the embodiment illustrated the upper compartment 23 has a window bearing the legend "Stop", the lower compartment 24 has a window with the legend "Slow", and the intermediate compartments 25 and 26 respectively have windows bearing the respective legends "Medium" and "Roe". In each of the compartments is a separate incandescent lamp 27 illustrated diagrammatically in Fig. 6.

In the arrangement illustrated the mechanism is adjusted so that when the speed of the vehicle is between a stationary position and one mile an hour, the lamp in the compartment 23 with the window desigated "Stop" will be illuminated so that the signal "Stop" will show during this condition of the vehicle; but when the speed of the vehicle exceeds one mile per hour and before it has attained a speed of eight miles an hour the lamp in the compartment 24 will be illuminated showing the signal "Slow", and between the speeds of eight and twelve miles an hour the lamp in the compartment 25 will be illuminated displaying the signal "Medium" to indicate a medium speed, and after the speed of the vehicle exceeds twelve miles an hour the lamp in the compartment 26 will be illuminated displaying any appropriate designations, that indicated in the drawing being designative of the name of the vehicle.

The separate lamp circuits comprise leads 28, 29, 30 and 31 connected at one end with the plate 10 through which the current passes through the shaft 8 through the movable switch construction mounted on the cup 7, all of said leads being in circuit with one pole of an energizing battery B. The other leads 32, 33, 34 and 35 of the lamp circuits are respectively connected with the segmental contact plates 19, 20, 21 and 22 and with the other pole of the energizing battery B. Thus it will be understood that when the speed of the vehicle is between zero and one mile per hour the circuit will be closed through the leads 28 and 32 energizing the incandescent lamp 27 in the compartment 23, and as the cup 7 is revolved as the speed of the vehicle increases and as the contact pin 18 is successively brought in contact with the segments 20, 21 and 22, the other lamp circuits will be successively closed, illuminating in succession the compartments 24, 25 and 26.

It will be observed from the foregoing description that the invention provides an accurate means of indicating visually to persons observing the vehicle from a distance the speed of the vehicle. As the illuminated signals in the embodiment shown are arranged at the rear of the vehicle and as one of the compartments under any condition of speed may be illuminated, the illuminated compartment may constitute a tail light as well as a signal device.

I am aware that my invention may find embodiment in modified structure without departing from the spirit and scope of the invention. I do not limit myself therefore to the exact construction shown and described, but what I claim and desire to secure by Letters Patent is:—

1. In a vehicle signal, the combination with a series of separately designated signal compartments, electric lamps in said compartments, and energizing circuits for said lamps, of a switch for controlling said circuits comprising a case, an annular series of contact segments mounted in said case, a revoluble member mounted in the case, a contact arm carried by said revoluble member and arranged to contact with said segments successively, a revoluble magnet for energizing the revoluble member whereby said revoluble member is turned and held in positions dependent upon the speed of rotation of said magnet, and a connection between said magnet and a wheel of the vehicle whereby the magnet is rotated coördinately with the speed of the vehicle.

2. In a vehicle signal, the combination with a series of separately designated signal compartments, electric lamps in each of said compartments, and energizing circuits for said lamps, of a switch for controlling said circuits comprising an annular series of contact segments, said segments being electrically connected with one lead of the energizing circuits for said lamps respectively, a contact arm having electrical connection with the other lead of said lamp energizing circuit, a movable support for said arm, a magnet within said support and coördinated therewith so that the support is moved different distances according to the speed of rotation of the magnet, a spring for holding said support in position that the contact arm normally is in contact with one of said segments, and means connecting the magnet with a wheel of the vehicle so that the contact arm support is moved from its normal position different distances to bring the contact arm in contact successively with the segments dependent upon the speed of the vehicle.

3. In a vehicle signal, a series of electrical circuits adapted to energize separate lamps, a switch comprising an annular series of segmental contact plates connected respectively with one lead of said circuits, a movable member, a contact arm carried by said movable member electrically connected with the opposite lead of said circuits, and a magnetic device operated by a wheel of the vehicle for moving said movable member relative distances dependent upon the speed of the vehicle whereby said contact arm is moved successively so that the circuits are closed in succession dependent upon the speed of the vehicle.

4. In a vehicle signal, a series of lamps, designated incasements for said lamps, and energizing circuits for said lamps arranged in combination with a switch comprising stationary contact plates connected with one lead of the circuits respectively, a contact element connected with the opposite lead of said circuits respectively, means including a magnetic device connected with a wheel of the vehicle for moving said contact arm for successive contact with certain ones of said contact plates, and means for returning said contact arm to a position in contact with one of said contact plates when the magnetic device is stationary.

5. In a vehicle signal, the combination with separate electrical circuits for energizing electric lamps, of a switch having an annular series of contact plates, said plates being of different lengths, a movable contact arm-support, a contact arm carried by said support, means for holding said support normally in contact with one of said contact plates, and a magnetic device connected with and operated by a wheel of the vehicle for moving said contact arm-support in opposition to the means holding it in normal position, whereby said contact arm is brought successively into contact with the contact plates.

In witness whereof, I have signed this specification.

JOHN MEILE.